Patented Apr. 19, 1927.

1,625,627

UNITED STATES PATENT OFFICE.

EMILE CHARLES CAMILLE ROUBAUD AND RAYMOND ALEXANDRE VEILLON, OF PARIS, FRANCE.

PRODUCT FOR DESTROYING MOSQUITO LARVÆ.

No Drawing. Application filed November 21, 1923, Serial No. 676,002, and in France November 30, 1922.

The present invention has for its object a product for destroying mosquito larvæ in the water in which they develop, such as the water of marshes, ponds, water reservoirs and the like.

Known methods for destroying the mosquito larvæ produced in stagnant water consist in the use of petroleum or similar oils, but their action proves ineffective in numerous cases. The product according to our invention is a powder which is toxic for the larvæ, consisting of a mixture of equal volumes of tri-oxymethylene $(CH_2O)_3$ and a vegetable powder nutritive for the larvæ and serving as a support. The said vegetable powder may consist of powdered leaves, straw, sawdust, or bark of various woods, and preferably of pine wood.

In order to obtain the larva-destroying product, we first prepare the said vegetable powder serving as a nourishment and support and if pine bark for instance is to be used for the purpose, the resinous bark is treated by crushing it in a suitable apparatus by which it is broken into small fragments, and these are placed in a hot air drying chamber in order to dry them completely. The bark fragments thus dried are placed in a ball mill in which they are very finely pulverized until an impalpable powder is obtained.

After obtaining the said impalpable vegetable powder, we add to the same in the crushing mill a volume of tri-oxymethylene which is equal to the volume of the vegetable powder. The mill is again operated and it now serves as a mixer, and the operation is continued until a thorough mixture of the tri-oxymethylene and the vegetable powder is obtained. This being effected, the mixture is removed from the mill in the form of an impalpable powder which may be utilized to destroy the larvæ.

For destroying the larvæ of mosquitoes and especially the anopheles whose larvæ remain at a short distance below the surface of the water, we discharge the said powder upon the surface of the water in light clouds by means of a blowing device, the minimum active charge being one centigramme per square metre.

For the destruction of mosquito larvæ usually found in city water reservoirs and which are at a greater depth, such for instance as the larvæ of gnats, various mosquitoes, and the like, we employ the following method. The said powder is mixed up with water, and the resulting liquid substance is spread upon fountains, or horseponds, in sprinkling carts, and in all places where the larvæ are to be destroyed, and the proper amount for this purpose will be a teaspoonful of the powder mixed up with about one litre of water, per square metre of the stagnant water to be treated.

Our said product is remarkably effective in destroying the larvæ, and its penetration and dispersion are easier and more complete upon marshes than the various oils in present use for the purpose. On the other hand, the product is absolutely inoffensive to live stock, fish, crops and the like. It does not soil the water, and does not prevent the water from being used for sprinkling, washing, stock-watering and like purposes. It can be manufactured at a small expense, so that large areas of marshes can be treated to advantage.

Having now described our invention what we claim as new and desire to secure by Letters Patent is:

1. A product for destroying mosquito larvæ formed of a mixture under the form of an impalpable powder of a solid toxic substance, substantially insoluble in cold water, with a nutritive substance for the larvæ.

2. A product for destroying mosquito larvæ formed of a mixture of pulverized tri-oxymethylene with a nutritive substance for the larvæ.

3. A product for destroying mosquito larvæ formed of a mixture of a volume of tri-oxymethylene finely pulverized with an equal volume of a fine vegetable powder nutritive for the larvæ.

4. A product for destroying mosquito larvæ formed of a mixture of a volume of tri-oxymethylene finely pulverized with an equal volume of pulverized pine wood.

5. A product for destroying mosquito larvæ formed of a mixture under the form of an impalpable powder of a solid toxic substance substantially insoluble in cold water with a nutritive substance for the larvæ, said powder being in suspension in water.

In testimony whereof we have signed our names to this specification.

EMILE CHARLES CAMILLE ROUBAUD.
RAYMOND ALEXANDRE VEILLON.